United States Patent
Katsumata et al.

(10) Patent No.: US 12,134,220 B2
(45) Date of Patent: Nov. 5, 2024

(54) INJECTION MOLDING MACHINE AND METHOD OF CONTROLLING THE SAME

(71) Applicant: SHIBAURA MACHINE CO., LTD., Tokyo-to (JP)

(72) Inventors: Ryuichi Katsumata, Numazu (JP); Yohei Yamazaki, Numazu (JP); Kotaro Maruoka, Numazu (JP)

(73) Assignee: SHUBAURA MACHINE CO., LTD., Tokyo-to (JP)

(*) Notice: Subject to any disclaimer, the term of this patent is extended or adjusted under 35 U.S.C. 154(b) by 377 days.

(21) Appl. No.: 17/624,521

(22) PCT Filed: Dec. 16, 2019

(86) PCT No.: PCT/JP2019/049247
§ 371 (c)(1),
(2) Date: Jan. 3, 2022

(87) PCT Pub. No.: WO2021/002038
PCT Pub. Date: Jan. 7, 2021

(65) Prior Publication Data
US 2022/0242022 A1  Aug. 4, 2022

(30) Foreign Application Priority Data
Jul. 4, 2019  (JP) .................. 2019-125437

(51) Int. Cl.
*B29C 45/76* (2006.01)
*B29C 45/04* (2006.01)
(Continued)

(52) U.S. Cl.
CPC .......... *B29C 45/7653* (2013.01); *B29C 45/04* (2013.01); *B29C 45/2602* (2013.01);
(Continued)

(58) Field of Classification Search
CPC .......... B29C 2945/76083; B29C 2945/76096; B29C 45/80; B29C 2945/76254;
(Continued)

(56) References Cited

U.S. PATENT DOCUMENTS

| | | | |
|---|---|---|---|
| 2012/0146260 A1* | 6/2012 | Murata | ................... B29C 45/77 264/328.1 |
| 2022/0203592 A1* | 6/2022 | Yoda | ................... B29C 45/7653 |

FOREIGN PATENT DOCUMENTS

| | | |
|---|---|---|
| DE | 22 37 644 | 7/1972 |
| GB | 1436338 | 5/1976 |

(Continued)

OTHER PUBLICATIONS

Translation of JP 2004-160682 (Year: 2004).*
(Continued)

*Primary Examiner* — John J DeRusso
(74) *Attorney, Agent, or Firm* — DLA Piper LLP (US)

(57) ABSTRACT

An injection molding machine, and a method of controlling the injection molding machine, can prevent a molding defect. The injection molding machine can mold a product for each execution of a molding cycle through an injecting process of injecting a material into clamped molds, a dwell process of controlling dwell pressure of the material in the molds, and a cooling process of cooling the material in the molds, the injection molding machine including a mold opening amount sensor and a controlling unit, the mold opening amount sensor being configured to detect a mold opening amount of the molds, the controlling unit being configured to control clamping force of the molds and the dwell pressure based on the mold opening amount during the molding cycle.

11 Claims, 10 Drawing Sheets

(51) Int. Cl.
  *B29C 45/26* (2006.01)
  *B29C 45/77* (2006.01)
  *B29C 45/80* (2006.01)
  *G05B 19/4155* (2006.01)

(52) U.S. Cl.
  CPC .............. *B29C 45/77* (2013.01); *B29C 45/80* (2013.01); *G05B 19/4155* (2013.01); *B29C 2945/76083* (2013.01); *B29C 2945/76096* (2013.01); *B29C 2945/76234* (2013.01); *B29C 2945/76254* (2013.01); *B29C 2945/76384* (2013.01); *B29C 2945/76498* (2013.01); *B29C 2945/76505* (2013.01); *B29C 2945/76732* (2013.01); *B29C 2945/76862* (2013.01); *G05B 2219/45244* (2013.01)

(58) Field of Classification Search
  CPC .......... B29C 2945/76257; B29C 2945/76267; B29C 2945/7627; B29C 2945/76234
  See application file for complete search history.

(56) References Cited

FOREIGN PATENT DOCUMENTS

| | | |
|---|---|---|
| JP | S62-82015 | 4/1987 |
| JP | H08-66951 | 3/1996 |
| JP | H08-281741 | 10/1996 |
| JP | H10-113963 | 5/1998 |
| JP | 2004-160682 | 6/2004 |
| JP | 2008-006651 | 1/2008 |
| JP | 2014-226805 | 12/2014 |
| JP | 2015-134442 | 7/2015 |

OTHER PUBLICATIONS

Chinese Office Action in Application No. 2019800980551, dated Feb. 16, 2023.
German Office Action in Application No. 11 2019 007 530.6, dated Sep. 15, 2023.
International Preliminary Report on Patentability in PCT/JP2019/049247, dated Jan. 13, 2022.
International Search Report in PCT/JP2019/049247, dated Mar. 17, 2020.
Written Opinion of ISR in PCT/JP2019/049247, dated Mar. 17, 2020.

* cited by examiner

INJECTION MOLDING MACHINE AND METHOD OF CONTROLLING THE SAME

CROSS REFERENCE TO RELATED APPLICATIONS

This application is a U.S. National Stage Application of International Application No. PCT/JP2019/049247 filed Dec. 16, 2019, which claims priority from Japanese Patent Application No. 2019-125437 filed Jul. 4, 2019. The entireties of all the above-listed applications are incorporated herein by reference.

TECHNICAL FIELD

Embodiments of the present invention relate to an injection molding machine and a method of controlling the same.

BACKGROUND ART

An injection molding machine molds resin by flowing the melted resin into a cavity between a plurality of clamped molds. One method of reducing a molding defect is a method of causing natural compression by decreasing clamping force of the molds. The natural compression is a series of behaviors through which the molds are opened by the internal pressure (mold internal pressure) of resin filling the molds and then is closed by solidification contraction of the resin and elastic recovery of a tie bar so that the resin is compressed.

However, it has been difficult to select an appropriate molding condition that causes the natural compression. For example, when the clamping force is too small, the molds are not completely closed but left opened after the natural compression in some cases. In this case, a molding defect such as a burr or a dimensional defect is potentially caused by excessive filling.

CITATION LIST

Patent Literature

[Patent Literature 1] Japanese Patent Laid-open No. 2015-134442

SUMMARY OF INVENTION

Technical Problem

It is an objective of the present invention to provide an injection molding machine capable of preventing a molding defect and a method of controlling the injection molding machine.

Solution to Problem

An injection molding machine according to the present embodiment is an injection molding machine that molds a product for each execution of a molding cycle through an injecting process of injecting a material into clamped molds, a dwell process of controlling dwell pressure of the material in the molds, and a cooling process of cooling the material in the molds, the injection molding machine including a mold opening amount sensor and a controlling unit, the mold opening amount sensor being configured to detect a mold opening amount of the molds, the controlling unit being configured to control clamping force of the molds and the dwell pressure based on the mold opening amount during the molding cycle.

DESCRIPTION OF EMBODIMENTS

Embodiments of the present invention will be described below with reference to the accompanying drawings. The present embodiments do not limit the present invention.

The drawings are schematic or conceptual, and the ratio of parts and the like are not necessarily identical to those in reality. In the specification and the drawings, the same element as that already described with reference to a drawing is denoted by the same reference sign, and detailed description thereof is omitted as appropriate.

First Embodiment

Figure 1:
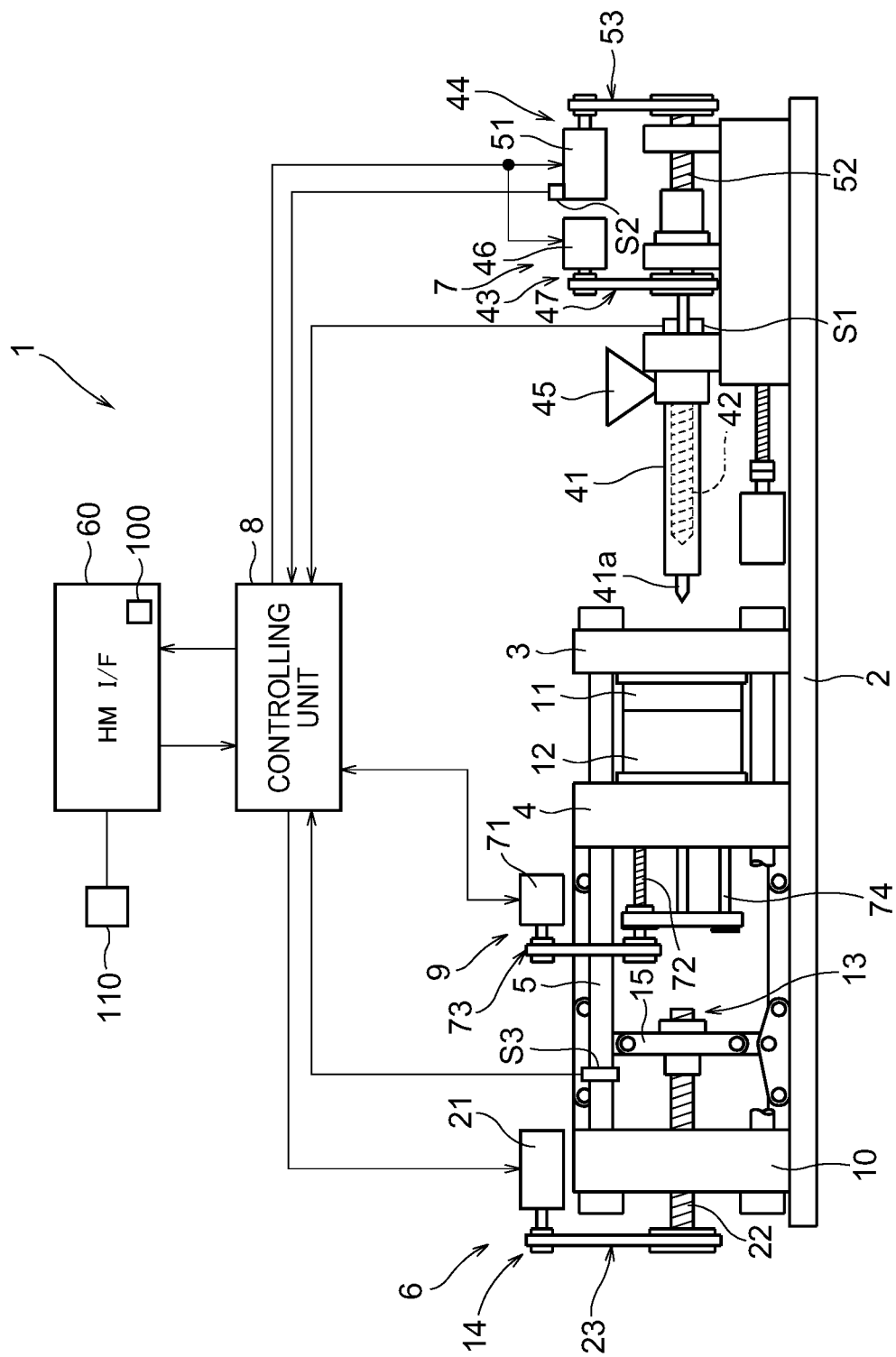
FIG. 1 is a block diagram illustrating an example of the configuration of an injection molding machine according to a first embodiment.

FIG. 1 is a block diagram illustrating an example of the configuration of an injection molding machine 1 according to a first embodiment. The injection molding machine 1 can repeatedly execute a series of injection molding operations and repeats, for example, a cycle operation in which a mold product is molded once. A cycle time is a time in which a series of cycle operations are executed.

The injection molding machine 1 includes a frame 2, a fixed board 3, a moving board 4, a tie bar 5, a clamp driving mechanism 6, an injecting device 7, a controlling unit 8, an extruding mechanism 9, a human-machine interface 60, a storing unit 110, an injection pressure sensor S1, a screw position sensor S2, and a tie bar sensor S3.

The frame 2 is a base of the injection molding machine 1. The fixed board 3 is fixed on the frame 2. A fixed mold 11 as a second mold is attached to the fixed board 3. One end of the tie bar 5 is fixed to the fixed board 3, and the other end thereof is connected with a supporting board 10. The tie bar 5 extends from the fixed board 3 to the supporting board 10 through the moving board 4.

The moving board 4 is placed on a linear guide, a slipping plate, a roller, or the like (not illustrated) provided to the frame 2. The moving board 4 can be guided by the tie bar 5 or the linear guide and move toward or away from the fixed board 3. A moving mold 12 as a first mold is attached to the moving board 4. The moving mold 12 faces the fixed mold 11, moves toward the fixed mold 11 together with the moving board 4, and becomes combined with the fixed mold 11. A space corresponding to a product shape is formed between the moving mold 12 and the fixed mold 11 when the moving mold 12 and the fixed mold 11 are combined in contact.

The clamp driving mechanism 6 includes a toggle mechanism 13 and a toggle mechanism driving unit 14. The toggle mechanism driving unit 14 includes a clamping servomotor 21, a ball screw 22, and a transferring mechanism 23 to drive the toggle mechanism 13. A cross head 15 is attached to a leading end part of the ball screw 22. The cross head 15 moves toward or away from the moving board 4 as the ball screw 22 rotates. The transferring mechanism 23 transfers rotation of the clamping servomotor 21 to the ball screw 22 to move the cross head 15.

The toggle mechanism 13 is actuated as the toggle mechanism driving unit 14 moves the cross head 15. For example, as the cross head 15 moves toward the moving board 4, the moving board 4 moves toward the fixed board 3 and the molds 11 and 12 are clamped. Oppositely, as the cross head 15 moves away from the moving board 4, the moving board 4 moves away from the fixed board 3 and the molds 11 and 12 are opened.

The extruding mechanism 9 includes an extruding servomotor 71, a ball screw 72, a transferring mechanism 73, and an extruding pin 74 to remove a product from the moving mold 12 after molding. A leading end part of the extruding pin 74 penetrates to the inner surface of the moving mold 12. As the ball screw 72 rotates, the extruding pin 74 extrudes the product adhering to the inner surface of the moving mold 12. The transferring mechanism 73 transfers rotation of the extruding servomotor 71 to the ball screw 72 to move the extruding pin 74 in the right-left direction in FIG. 1 as the ball screw 72 rotates.

The injecting device 7 includes a heating barrel (band heater) 41, a screw 42, a measurement driving unit 43, and an injection driving unit 44. The heating barrel 41 includes a nozzle 41a through which resin being melted is injected into a cavity of the molds being clamped. The heating barrel 41 melts and stores resin from a hopper 45 by heating and ejects the melted resin through the nozzle. The screw 42 is provided to be able to move while rotating or not rotating inside the heating barrel 41. In a measurement process, as the screw 42 rotates, melted resin is extruded to a leading end side of the heating barrel 41, and the screw 42 retracts being pressed by the extruded melted resin. The amount of melted resin ejected from the barrel 41 is measured and determined based on a travel distance by which the screw 42 retracts. In an injecting process, the screw 42 moves without rotating and ejects melted resin through the nozzle.

The measurement driving unit 43 includes a measuring servomotor 46, and a transferring mechanism 47 configured to transfer rotation of the measuring servomotor 46 to the screw 42. Resin is introduced from the hopper 45 into the heating barrel 41 as the measuring servomotor 46 is driven and the screw 42 is rotated in the heating barrel 41. The introduced resin is transferred to the leading end side of the heating barrel 41 while being heated and mixed. The resin is melted and stored at a leading end part of the heating barrel 41. The melted resin is ejected from the barrel 41 as the screw 42 is moved in a direction opposite to that in measurement. In this case, the screw 42 moves without rotating and extrudes the melted resin through the nozzle. Although melted resin is used as a molding material in the present embodiment, the molding material is not limited to melted resin but may be metal, glass, rubber, carbonized compound including carbon fiber, or the like.

The injection driving unit 44 includes an injecting servomotor 51, a ball screw 52, and a transferring mechanism 53. The screw 42 in the heating barrel 41 moves in the right-left direction in FIG. 1 as the ball screw 52 rotates. The transferring mechanism 53 transfers rotation of the injecting servomotor 51 to the ball screw 52. Accordingly, the screw 42 moves as the injecting servomotor 51 rotates. As extruded through the nozzle 41a by the screw 42, melted resin stored at the leading end part of the heating barrel 41 is ejected from the nozzle 41a.

The injection pressure sensor S1 detects filling pressure when the molds are filled with melted resin from the barrel 41, and dwell pressure in a dwell process. In the injecting process, the injection pressure sensor S1 detects injection pressure of melted resin from the barrel 41 to the molds. In the dwell process, the injection pressure sensor S1 detects the dwell pressure of melted resin after dwell switching from speed control to pressure control.

The screw position sensor S2 detects the position of the screw 42. Since the screw 42 moves along with rotation of the injecting servomotor 51, the screw position sensor S2 may detect the position of the screw 42 based on the rotation speed and angular position of the injecting servomotor 51. The speed and acceleration of the screw 42 can be determined by detecting the position of the screw 42 in each predetermined control period.

The tie bar sensor S3 as a mold opening amount sensor can determine a mold opening amount of the molds 11 and 12. For example, the tie bar sensor S3 is provided to the tie bar 5 and detects an expanding-contracting amount of the tie bar 5 that expands and contracts in accordance with clamping force. Accordingly, the expanding-contracting amount (distortion) of the tie bar 5 is detected and the mold opening amount of the molds 11 and 12 is calculated based on the expanding-contracting amount. Specifically, the mold opening amount is calculated based on the difference between a set expanding-contracting amount of the tie bar 5 for clamping force and the detected expanding-contracting amount.

The human-machine interface (HM I/F) 60 displays various kinds of information related to the injection molding machine 1. For example, the HM I/F 60 may include a displaying unit 100 and a keyboard or may be a touch panel display. A user can input settings of commands and the like related to operation of the injection molding machine 1 through the HM I/F 60. For example, the injection molding machine 1 molds a product for each execution of a molding cycle through the injecting process of injecting melted resin into the clamped molds, the dwell process of controlling the dwell pressure of the melted resin in the molds, and a cooling process of cooling the melted resin in the molds. In the cooling process, the injection molding machine 1 stops dwelling and performs measurement for the next execution of the molding cycle. Hereinafter, the injecting process is also referred to as a filling process.

The controlling unit 8 monitors sensor information received from various sensors (not illustrated) and controls the clamp driving mechanism 6 and the injecting device 7 based on the sensor information. The controlling unit 8 also controls the screw 42 in accordance with the above-described setting values set through the HM I/F 60. In addition, the controlling unit 8 causes the displaying unit 100 to display necessary data.

The storing unit 110 stores a plurality of pieces of operation information of the injection molding machine 1. The operation information is information indicating operation of the molds 11 and 12, the clamp driving mechanism 6, or the injecting device 7. The operation information includes, for example, a molding condition to be described later. The storing unit 110 also stores the mold opening amount of the molds 11 and 12, which is obtained from the tie bar sensor S3. The storing unit 110 may be provided outside or inside the injection molding machine 1.

Figure 2:
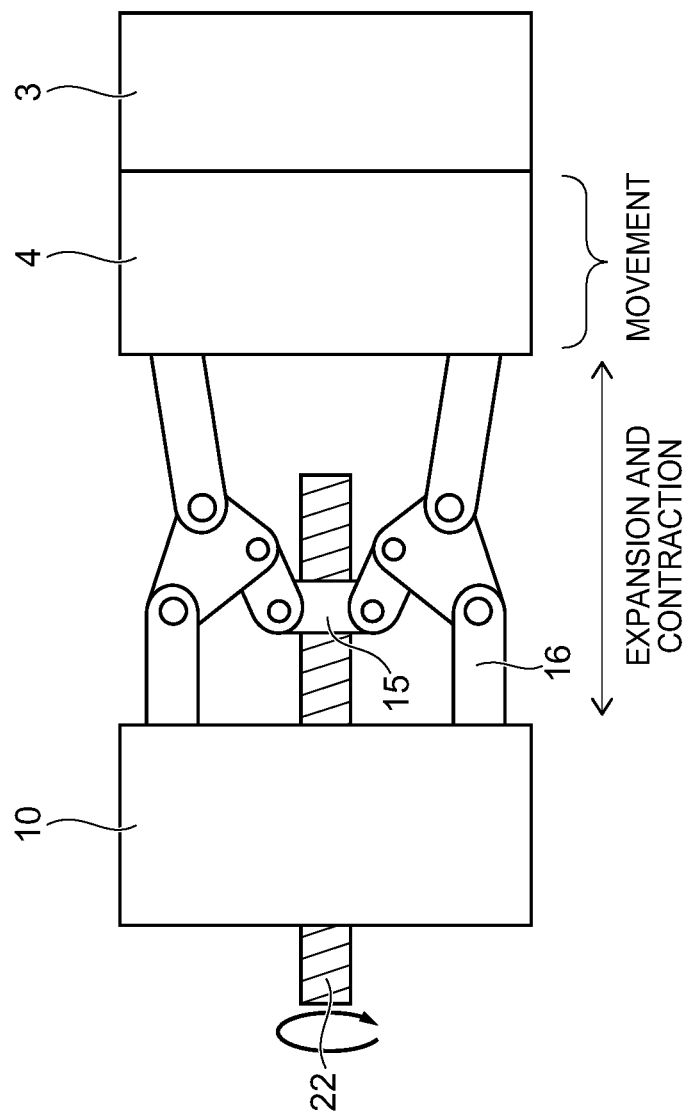
FIG. 2 is a schematic diagram illustrating an example of clamping force adjustment by a clamp driving mechanism.

FIG. 2 is a schematic diagram illustrating an example of clamping force adjustment by the clamp driving mechanism 6.

The toggle mechanism 13 includes a toggle link 16 and the supporting board 10. As illustrated in FIG. 2, one end of the toggle link 16 is connected with the moving mold 12 (moving board 4). The supporting board 10 is connected with the other end of the toggle link 16 and supports the toggle link 16. The toggle mechanism 13 moves the moving mold 12 (moving board 4) by bending or extension of the toggle link 16. For example, the clamping servomotor 21 illustrated in FIG. 1 rotates the ball screw 22. As the cross head 15 moves toward the moving board 4 by the rotation of the ball screw 22, the toggle link 16 extends and the moving board 4 moves toward the fixed board 3. The molds 11 and 12 are closed as the toggle link 16 extends, and the tie bar 5 extends and the clamping force increases as the toggle link 16 further extends. As the cross head 15 moves away from the moving board 4, the tie bar 5 first elastically recovers and the clamping force decreases. Then, as the toggle link 16 bends, the molds 11 and 12 are opened and the moving board 4 moves away from the fixed board 3. In this manner, it is possible to adjust movement of the moving board 4 relative to the fixed board 3 by expansion and contraction of the toggle link 16, thereby adjusting the clamping force.

Figure 3:
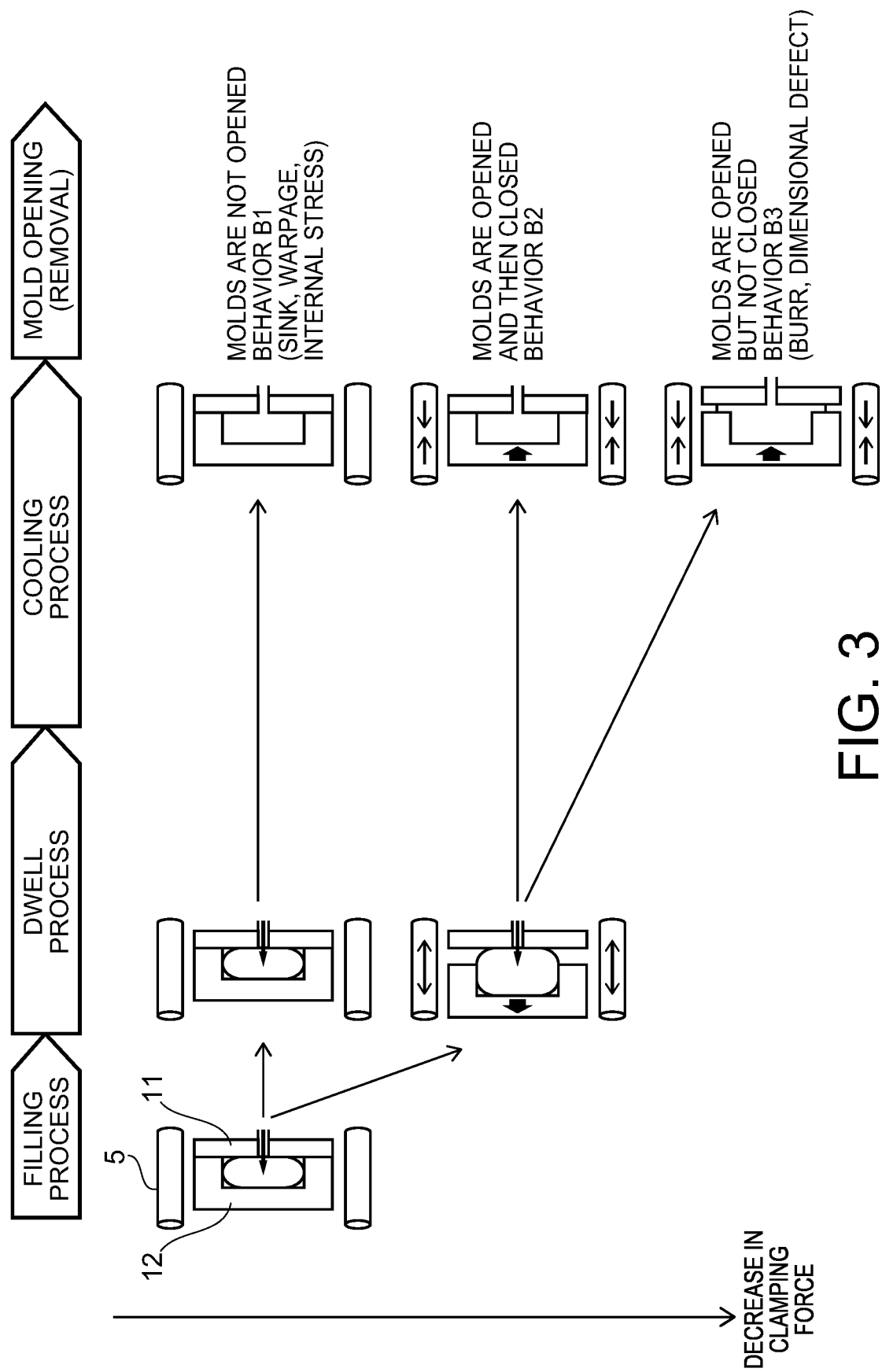
FIG. 3 is a schematic diagram illustrating an example of natural compression according to the first embodiment.

FIG. 3 is a schematic diagram illustrating an example of natural compression according to the first embodiment. FIG. 3 illustrates the relation between the clamping force before start of the filling process and the behavior of the molds 11 and 12 through one execution of the molding cycle. The natural compression is a series of behaviors that, as illustrated in behavior B2 in FIG. 3, the molds 11 and 12 are opened when the pressure (mold internal pressure) of filling resin exceeds the clamping force and then the molds 11 and 12 are closed by contraction of the resin and elastic recovery of the tie bar 5.

Injection molding is normally performed under large clamping force and high dwell pressure to prevent a molding defect such as a sink or a burr. A sink is a pit that occurs to the surface of a product when the dwell pressure is insufficient and the density of resin is low. A burr is solidification of resin leaked from the gap between the molds 11 and 12 when the clamping force is insufficient for the mold internal pressure (dwell pressure) and the molds 11 and 12 are opened. When injection molding is performed under large clamping force and high dwell pressure, the molds 11 and 12 are not opened from the filling process to the cooling process as illustrated in behavior B1 in FIG. 3. However, even under large clamping force and high dwell pressure, it is difficult to remove a sink depending on the kind of resin and the shape of a product in some cases. For example, when a gate that is a resin flow path connected to the cavity is narrow, the dwell pressure is unlikely to be transferred to resin in some cases. When resin near the gate is solidified, the dwell pressure is further unlikely to be transferred to the resin in some cases. In these cases, a sink is likely to occur. In addition, the dwell pressure is likely to be biased near the gate when the gate is narrow. This bias of the dwell pressure causes a molding defect such as warpage or internal distortion (internal stress) in some cases. The warpage is warping of a mold product. The internal distortion is, for example, density bias and affects the quality of an optical product such as a lens.

As illustrated in behavior B2 in FIG. 3, the clamping force is decreased to cause the natural compression in some cases. For example, clamping force of 30 t is set before start of the filling process. In the dwell process, the molds 11 and 12 are opened. The mold opening amount is, for example, 0.02 mm to 0.10 mm. Accordingly, the tie bar 5 is extended and the clamping force is increased (for example, from 30 t to 35 t) in the dwell process. In the dwell process and the subsequent cooling process, resin is cooled and contracts. In this case, the tie bar 5 being extended contracts by elastic force and the resin is compressed. When the molds 11 and 12 are closed, the tie bar 5 returns to a state before the dwell process, and the clamping force being increased returns to the value before the dwell process (for example, from 35 t to 30 t).

In the natural compression, since the gate expands as the molds 11 and 12 are opened, the dwell pressure is more likely to be transferred to resin in the dwell process. Moreover, the whole resin including surplus inflow resin is substantially uniformly compressed, and thus the density can be substantially uniformly increased. Accordingly, it is possible to prevent a sink. In addition, since the narrow gate expands, it is possible to prevent bias of the dwell pressure, thereby preventing a molding defect such as warpage or internal stress. In the natural compression example illustrated in FIG. 3, the molds 11 and 12 are opened and closed by elastic deformation of the tie bar 5 and solidification contraction of resin. Accordingly, the user does not need to control the clamping force nor opening and closing of the molds 11 and 12 during each execution of the molding cycle. Thus, the user does not need a special device and special knowledge and experience.

However, it is difficult to appropriately select a molding condition such as the clamping force in some cases. For example, when the clamping force is excessively decreased, a molding defect such as a burr or a dimensional defect occurs due to excessive filling as illustrated in behavior B3 in FIG. 3, and the molds 11 and 12 are not completely closed but are left opened at end of the cooling process in some cases.

Thus, the controlling unit 8 controls the clamping force of the molds 11 and 12 and the dwell pressure based on the mold opening amount during the molding cycle. Accordingly, it is possible to set the clamping force and the dwell pressure while monitoring the opening-closing behavior of the molds 11 and 12 due to the natural compression. As a result, it is possible to cause the natural compression while preventing a molding defect such as a burr or a dimensional defect. Hereinafter, a "molding condition" means a "molding condition of the clamping force and the dwell pressure" unless otherwise stated.

Subsequently, a molding condition selection method will be described below with reference to FIG. 4.

Figure 4:
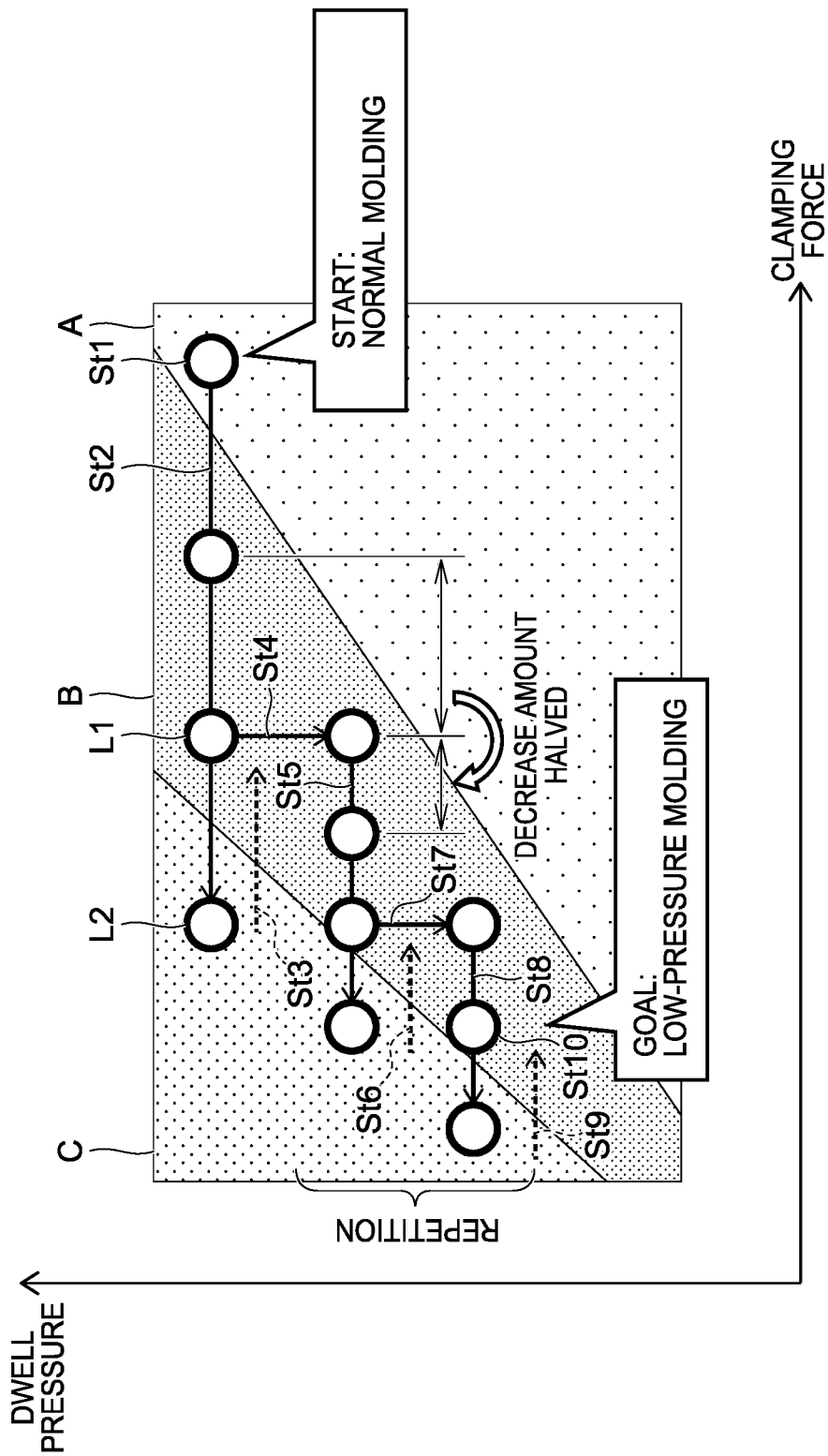
FIG. 4 is a schematic diagram illustrating an example of molding condition selection according to the first embodiment.

FIG. 4 is a schematic diagram illustrating an example of molding condition selection according to the first embodiment. FIG. 4 illustrates the relation between the clamping force and the dwell pressure. The horizontal axis represents the clamping force, and the vertical axis represents the dwell pressure. FIG. 4 also illustrates regions A, B, and C of the molding condition of the clamping force and the dwell pressure, which correspond to behaviors B1 to B3 in FIG. 3, respectively. Region A is a region of the molding condition for behavior B1 that the molds 11 and 12 are not opened. Region B is a region of the molding condition for behavior B2 that the molds 11 and 12 are opened and then closed. Region C is a region of the molding condition for behavior B3 that the molds 11 and 12 are opened and then not closed. Specifically, the boundary between region A and region B indicates whether the molds 11 and 12 are opened in the dwell process or the cooling process. The boundary between region B and region C indicates whether the molds 11 and 12 are closed at end of the cooling process. A circle indicates the clamping force and the dwell pressure in each execution of the molding cycle (each shot). Thus, FIG. 4 is also a flowchart of molding condition selection during continuous molding.

The natural compression occurs depending on the balance relation between the mold internal pressure and the clamping force. The mold internal pressure decreases as the dwell pressure decreases. Thus, as illustrated in FIG. 4, when the clamping force is decreased and the molding condition has reached region C, the molding condition returns in region B again by decreasing the dwell pressure in some cases. Specifically, as the dwell pressure decreases, the molds 11 and 12 become unlikely to be opened and a burr becomes unlikely to be generated even when the clamping force is small. Moreover, when the dwell pressure is decreased, the clamping force can be further decreased.

First, the user sets the molding condition of normal molding, and the injection molding machine 1 executes injection molding under this condition (St1). The molding condition of normal molding is, for example, the molding condition in region A. For example, the clamping force of 100 t and the dwell pressure of 100 MPa are set in the molding condition of normal molding but may be optionally set by the user.

Subsequently, the controlling unit 8 causes the injection molding machine 1 to repeatedly execute the molding cycle while decreasing the clamping force in the subsequent execution of the molding cycle (St2). In addition, the controlling unit 8 determines whether the molding condition has reached region C based on the mold opening amount after each execution of the molding cycle (St2). Until the molding condition reaches region C, the controlling unit 8 performs, for example, update to decrease the clamping force by 10 t (10% of a case of normal molding) for each execution of the molding cycle. For example, the clamping force decreases as the toggle link 16 contracts and the moving board 4 moves away from the fixed board 3. As illustrated in FIG. 4, the molding condition of normal molding reaches region C as the clamping force decreases. Details of the determination of whether the molding condition has reached region C and details of L1 and L2 will be described later with reference to FIG. 5. The continuous operation from each execution of the molding cycle to execution of the next execution of the molding cycle through the determination may be fully automatic. Alternatively, at each execution of the molding cycle, the user may provide a command to start the molding cycle through the HM I/F 60.

Subsequently, when having determined that the molding condition has reached region C, the controlling unit 8 sets the clamping force back to the clamping force in the previous execution of the molding cycle (St3). The controlling unit 8 performs, for example, update to increase the clamping force by 10 t. For example, the clamping force increases as the toggle link 16 extends and the moving board 4 moves toward the fixed board 3. In this case, the molding condition returns in region B as illustrated in FIG. 4.

Subsequently, the controlling unit 8 decreases the dwell pressure (St4). The controlling unit 8 performs update to decrease the dwell pressure by, for example, 10 MPa (10% of a case of normal molding).

Subsequently, similarly to step St2, the controlling unit 8 causes the injection molding machine 1 to repeatedly execute the molding cycle while decreasing the clamping force (St5). After the dwell pressure is decreased once, for example, the clamping force is decreased by a halved decreasing amount of 5 t. This obtains a finer detection interval and thus leads to the molding condition that is closer to the boundary between region B and region C and with which the natural compression provides a large effect. In addition, it is possible to select the molding condition in a region of small clamping force and low dwell pressure. At step St5 as well, similarly to step St2, the controlling unit 8 determines whether the molding condition has reached region C based on the mold opening amount after each execution of the molding cycle.

Subsequently, similarly to step St3, when having determined that the molding condition has reached region C, the controlling unit 8 sets the clamping force back to the clamping force in the previous execution of the molding cycle (St6).

Subsequently, the controlling unit 8 repeats execution similarly to steps St4 to St6 (St7 to St9). The selection of the molding condition of low-pressure molding ends at end of step St9. The clamping force and the dwell pressure in the molding condition of low-pressure molding are smaller and lower, respectively, than those in the molding condition of normal molding.

Subsequently, the controlling unit 8 can cause the injection molding machine 1 to repeatedly execute the molding cycle under the clamping force and the dwell pressure updated at end of step St9 (St10). In this case, the injection molding machine 1 performs product mass production (continuous production) under the selected molding condition.

The decreasing and increasing amounts of the clamping force and the dwell pressure may be optionally set by the user.

In the example illustrated in FIG. 4, decrease in the dwell pressure and decrease in the clamping force, and setting-back of the clamping force are repeated twice, for example. The number of repetitions as an end condition may be changed depending on setting by the user, the kind of resin, or the shape of a mold product. The user may end the molding condition selection at an optional timing when having determined that a mold product is a non-defective product. Accordingly, a time taken for the molding condition selection can be reduced.

The user can select the molding condition of low-pressure molding by setting the molding condition of normal molding and causing the injection molding machine 1 to execute continuous molding. As illustrated in FIG. 4, the clamping force and the dwell pressure in the molding condition of low-pressure molding become smaller and lower through decrease in not only the clamping force but also the dwell pressure. As described above, bias of the dwell pressure in the dwell process potentially causes warpage and internal stress. In low-pressure molding, bias of the dwell pressure on resin is smaller since the dwell pressure is set to be small. Thus, it is possible to further prevent a molding defect such as warpage or internal stress.

Subsequently, determination of whether the molding condition has reached region C will be described below with reference to FIG. 5.

Figure 5:
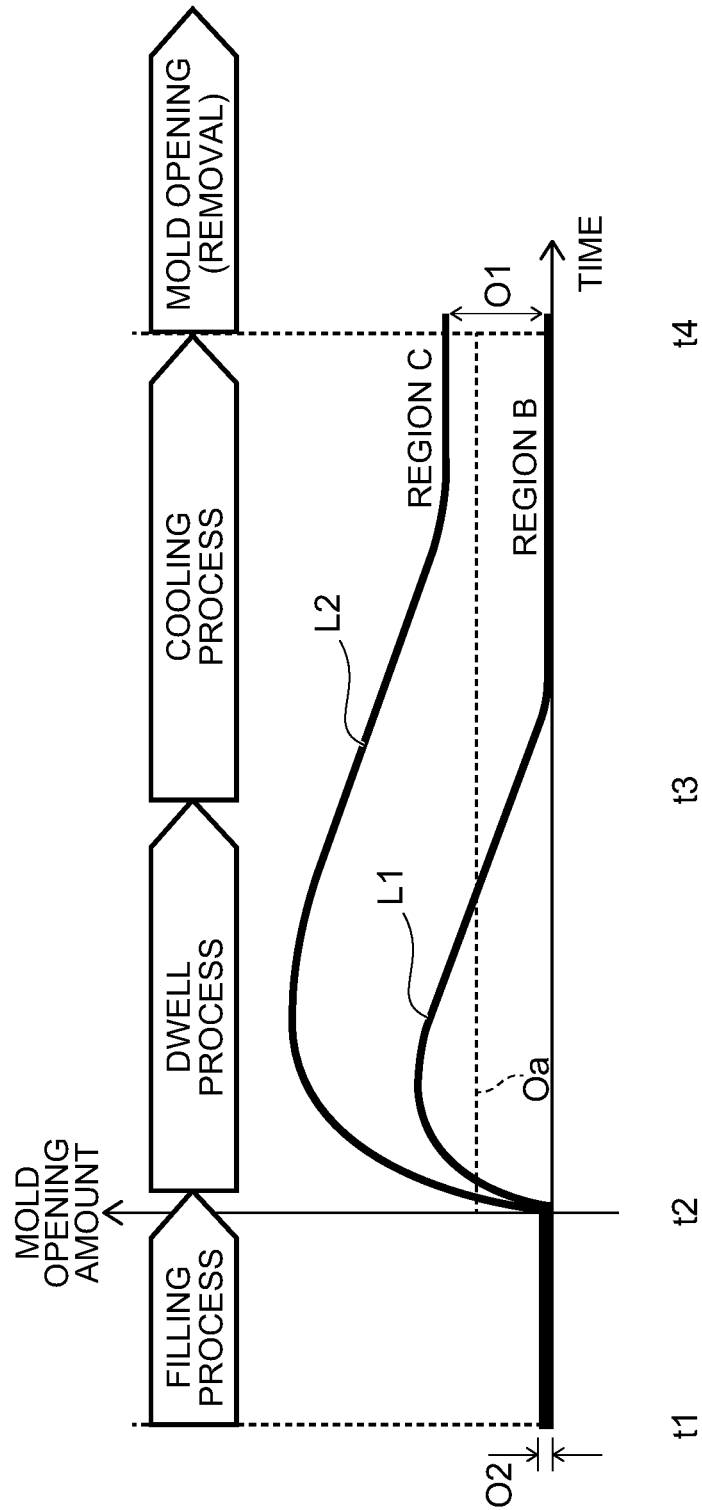
FIG. 5 is a graph illustrating an example of mold opening amount temporal change during each execution of a molding cycle according to the first embodiment.

FIG. 5 is a graph illustrating an example of temporal change of the mold opening amount during each execution of the molding cycle according to the first embodiment. The mold opening amount can be obtained by the tie bar sensor S3. The horizontal axis represents time, and the vertical axis represents the mold opening amount. Solid lines L1 and L2 correspond to respective executions of the molding cycle illustrated in FIG. 4.

In the filling process (t1 to t2), the molds 11 and 12 are not opened, and thus the mold opening amount in L1 and L2 is substantially 0 mm. In the dwell process and the cooling process (t2 to t4), the mold opening amount in L1 and L2 increases and then decreases, and thus has a peak. This is because the natural compression occurs in t2 to t4. Since the clamping force in L2 is smaller than the clamping force in L1, the mold opening amount in L2 is larger than the mold opening amount in L1. At end (t4) of the cooling process, the mold opening amount in L1 is substantially 0 mm. However, the mold opening amount in L2 is larger than zero at t4.

The controlling unit 8 controls the clamping force and the dwell pressure based on a first mold opening amount O1 that is the mold opening amount at end of the cooling process. More specifically, the controlling unit 8 controls the clamping force and the dwell pressure based on comparison between the first mold opening amount O1 and a predetermined mold opening amount Oa. The predetermined mold opening amount Oa is an allowable value of the mold opening amount, under which a molding defect such as a burr or a dimensional defect is unlikely to occur. The predetermined mold opening amount Oa may be set with measurement error taken into account. The predetermined mold opening amount Oa is, for example, 0.01 mm but may be optionally set by the user.

The injection molding machine 1 repeatedly executes the molding cycle. For each execution of the molding cycle, when the first mold opening amount O1 is equal to or smaller than the predetermined mold opening amount Oa, the controlling unit 8 performs update to decrease the clamping force. For example, the mold opening amount in L1 at t4 is equal to or smaller than the predetermined mold opening amount Oa. Thus, the controlling unit 8 determines that the molds 11 and 12 are closed (region B), and performs update to decrease the clamping force (steps St2, St5, and St8 in FIG. 4). Accordingly, the mold opening amount becomes larger in the next execution of the molding cycle.

For each execution of the molding cycle, when the first mold opening amount O1 is larger than the predetermined mold opening amount Oa, the controlling unit 8 performs update to increase the clamping force and decrease the dwell pressure. For example, the mold opening amount in L2 at t4 is larger than the predetermined mold opening amount Oa. Thus, the controlling unit 8 determines that the molds 11 and 12 are not completely closed but opened (region C), and performs update to increase the clamping force and decrease the dwell pressure (steps St3, St4, St6, St7, and St9 in FIG. 4). Accordingly, the mold opening amount becomes smaller in the next execution of the molding cycle.

In this manner, the opening-closing behavior of the molds 11 and 12 during the molding cycle can be monitored based on the mold opening amount. In addition, when having reached region C, the molding condition can be set back in region B. Accordingly, it is possible to select the molding condition under which the natural compression can occur while a burr and a dimensional defect due to excessive filling are prevented. In region A, the molds 11 and 12 are not opened in the dwell process and the cooling process. Thus, it can be determined that the molds 11 and 12 are closed in region A like region B.

For example, the predetermined mold opening amount Oa may be a second mold opening amount O2 that is the mold opening amount at start of the filling process, or the predetermined mold opening amount Oa may be a mold opening amount larger than the second mold opening amount O2. For example, the mold opening amount has an offset in some cases. The offset potentially changes with the stiffness of the molds 11 and 12 or the like. Thus, the predetermined mold opening amount Oa may be set with the mold opening amount (O2) at start (t1) of the filling process as the offset.

The controlling unit 8 automatically controls the clamping force and the dwell pressure. Accordingly, the molding condition selection from normal molding to low-pressure molding is automatically performed. Thus, the user can save work for the molding condition selection. The molding condition selection is not limited to being automatically performed but may be performed by the user. For example, the displaying unit 100 displays the graph of temporal change of the mold opening amount, which is illustrated in FIG. 5, for each execution of the molding cycle. The user may determine update of the clamping force and the dwell pressure based on the mold opening amount as described above and may set the update to the HM I/F 60.

As described above, according to the first embodiment, the tie bar sensor S3 can determine the mold opening amount of the molds 11 and 12. The controlling unit 8 controls the clamping force of the molds 11 and 12 and the dwell pressure of resin in the dwell process based on the mold opening amount during the molding cycle. With the control based on the mold opening amount, it is possible to select the molding condition under which the natural compression can occur while a burr and a dimensional defect are prevented. As a result, it is possible to prevent molding defects such as a sink, warpage, internal stress, a burr, and a dimensional defect. In addition, since the clamping force and the dwell pressure are both controlled to decrease, the molding condition of small clamping force and low dwell pressure can be selected. It is possible to further prevent molding defects such as warpage and internal stress as described above by decreasing the dwell pressure.

The injection molding machine 1 with the clamping force larger than needed has been normally used in some cases when optimum clamping force is unknown. In addition, excessive clamping force and excessive mold internal pressure provide large loads on the molds 11 and 12 and have potentially shortened the lifetimes of the molds 11 and 12.

However, according to the first embodiment, the molding condition of small clamping force and low dwell pressure can be selected, and thus the injection molding machine 1 having a reduced size can be used. Moreover, the lifetimes of the molds 11 and 12 can be lengthened.

In the first embodiment, the injection pressure in the filling process (t1 to t2) is not changed from that in the condition of normal molding. The injection pressure affects an appearance defect such as a swirl mark. The swirl mark is an appearance defect that a pattern is generated on the surface of a product through foam formation of resin. Thus, according to the first embodiment, it is possible to prevent a molding defect while preventing degradation of the quality of appearance.

The controlling unit 8 may determine whether the molding condition has reached region C by using the clamping force that can be determined by the tie bar sensor S3. In this case, the controlling unit 8 controls the clamping force and the dwell pressure based on comparison between the clamping force at start (t1) of the filling process and the clamping force at end (t4) of the cooling process. For example, in a case in which the clamping force at start of the filling process is substantially 30 t, the controlling unit 8 may determine that the molds 11 and 12 are closed when the clamping force is substantially 30 t at end of the cooling process.

A mold position sensor may be used in place of the tie bar sensor S3 as a mold opening amount sensor. The mold position sensor detects the positions of the molds 11 and 12. For example, the mold position sensor is provided at a parting portion (contact surface) of the molds 11 and 12 and directly detects the mold opening amount.

(Modification 1)

Figure 6:
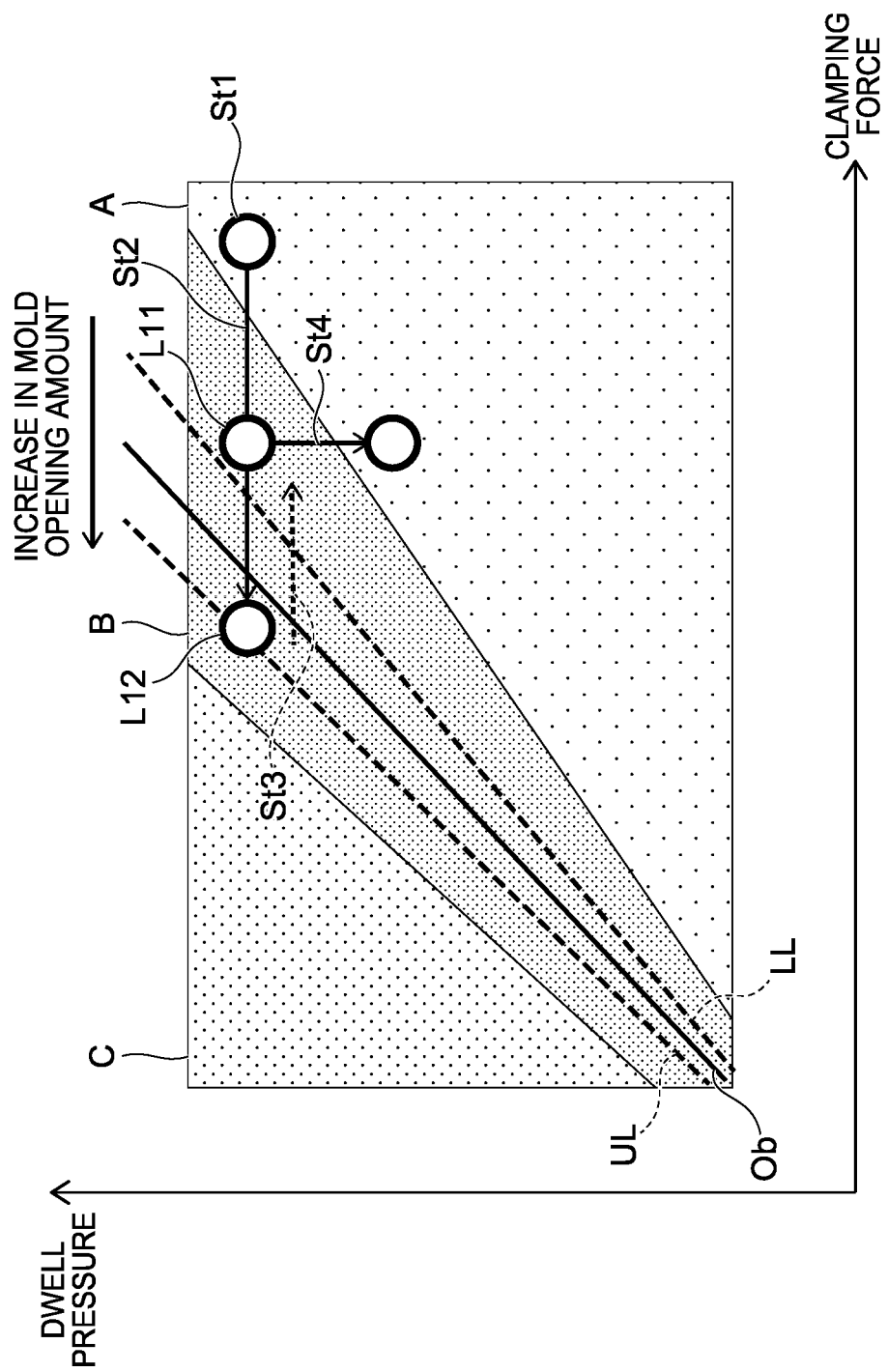
FIG. 6 is a schematic diagram illustrating an example of molding condition selection according to Modification 1.

FIG. 6 is a schematic diagram illustrating an example of molding condition selection according to Modification 1. Modification 1 of the first embodiment is different from the first embodiment in that the molding condition is selected by using a maximum value at the peak of the mold opening amount in the dwell process or the cooling process.

In FIG. 6, the maximum value of the mold opening amount is substantially 0 mm near the border line between region A and region B. The maximum value of the mold opening amount increases as the molding condition moves toward region C. Thus, the controlling unit 8 may control the clamping force and the dwell pressure so that the maximum value of the mold opening amount is substantially constant for each execution of the molding cycle. The determination at step St2 in FIG. 6 is performed based on a condition different from that at step St2 (St5, St8) in FIG. 4 in the first embodiment. The other steps St3, St4, St6, St7, St9, and St10 may be same as those in the first embodiment. Details of determination based on the maximum value of the mold opening amount and details of L11 and L12 will be described later with reference to FIG. 7.

The controlling unit 8 according to Modification 1 controls the clamping force and the dwell pressure based on the maximum value of the mold opening amount in the dwell process or the cooling process. More specifically, the controlling unit 8 controls the clamping force and the dwell pressure based on comparison between the maximum value of the mold opening amount and a target mold opening amount Ob. The target mold opening amount Ob is a target value of the mold opening amount, which is optionally set by the user. The molding condition for the target mold opening amount Ob is indicated substantially straight in the relation between the clamping force and the dwell pressure as illustrated in FIG. 6. The strength of the natural compression can be adjusted by adjusting the target mold opening amount Ob. The target mold opening amount Ob may be provided with an upper limit UL and a lower limit LL. The upper limit UL of the target mold opening amount Ob is, for example, a mold opening amount at which the molding condition is close to region C and a burr is highly likely to occur. The upper limit UL is, for example, 0.10 mm but may be changed depending on the kind of resin or the like. The lower limit LL of the target mold opening amount Ob is, for example, a mold opening amount at which the molding condition is close to region A and it is difficult to prevent a molding defect such as a sink.

Subsequently, determination based on the maximum value of the mold opening amount will be described below with reference to FIG. 7.

Figure 7:
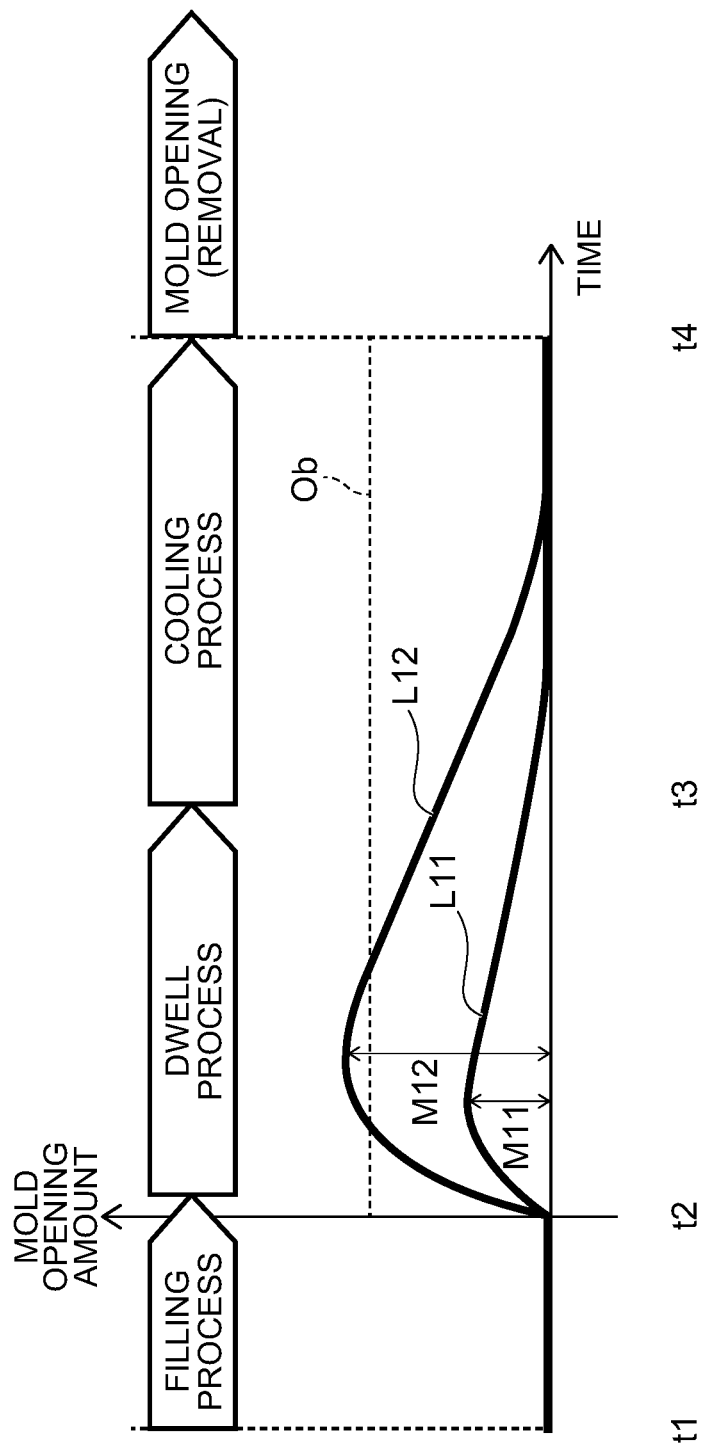
FIG. 7 is a graph illustrating an example of mold opening amount temporal change during each execution of the molding cycle according to Modification 1.

FIG. 7 is a graph illustrating an example of temporal change of the mold opening amount during each execution of the molding cycle according to Modification 1. Solid lines L11 and L12 correspond to respective executions of the molding cycle illustrated in FIG. 6.

The injection molding machine 1 repeatedly executes the molding cycle. For each execution of the molding cycle, when the maximum value is equal to or smaller than the target mold opening amount Ob, the controlling unit 8 performs update to decrease the clamping force. For example, a maximum value M11 of the mold opening amount in L11 is equal to or smaller than the target mold opening amount Ob. Thus, the controlling unit 8 determines that the maximum value of the mold opening amount does not exceed the target mold opening amount Ob, and performs update to decrease the clamping force (step St2 in FIG. 6). Accordingly, the mold opening amount becomes larger in the next execution of the molding cycle.

For each execution of the molding cycle, when the maximum value is larger than the target mold opening amount Ob, the controlling unit 8 performs update to increase the clamping force and decrease the dwell pressure. For example, a maximum value M12 of the mold opening amount in L12 is larger than the target mold opening amount Ob. Thus, the controlling unit 8 determines that the maximum value of the mold opening amount exceeds the target mold opening amount Ob, and performs update to increase the clamping force and decrease the dwell pressure (steps St3 and St4 in FIG. 6). Accordingly, the mold opening amount becomes smaller in the next execution of the molding cycle.

The injection molding machine 1 according to Modification 1 can provide effects same as those of the first embodiment.

After having determined that the maximum value of the mold opening amount exceeds the target mold opening amount Ob, the controlling unit 8 may decrease the dwell pressure without increasing the clamping force. Specifically, the controlling unit 8 may omit step St3 in FIG. 6 and execute step St4. This is because a burr is unlikely to occur in some cases even when the maximum value of the mold opening amount exceeds the target mold opening amount Ob. Without setting-back of the clamping force, a time taken for the molding condition selection can be reduced. However, it is not so preferable to decrease the dwell pressure without increasing the clamping force because a burr occurs depending on setting of the target mold opening amount Ob.

(Modification 2)

Figure 8:
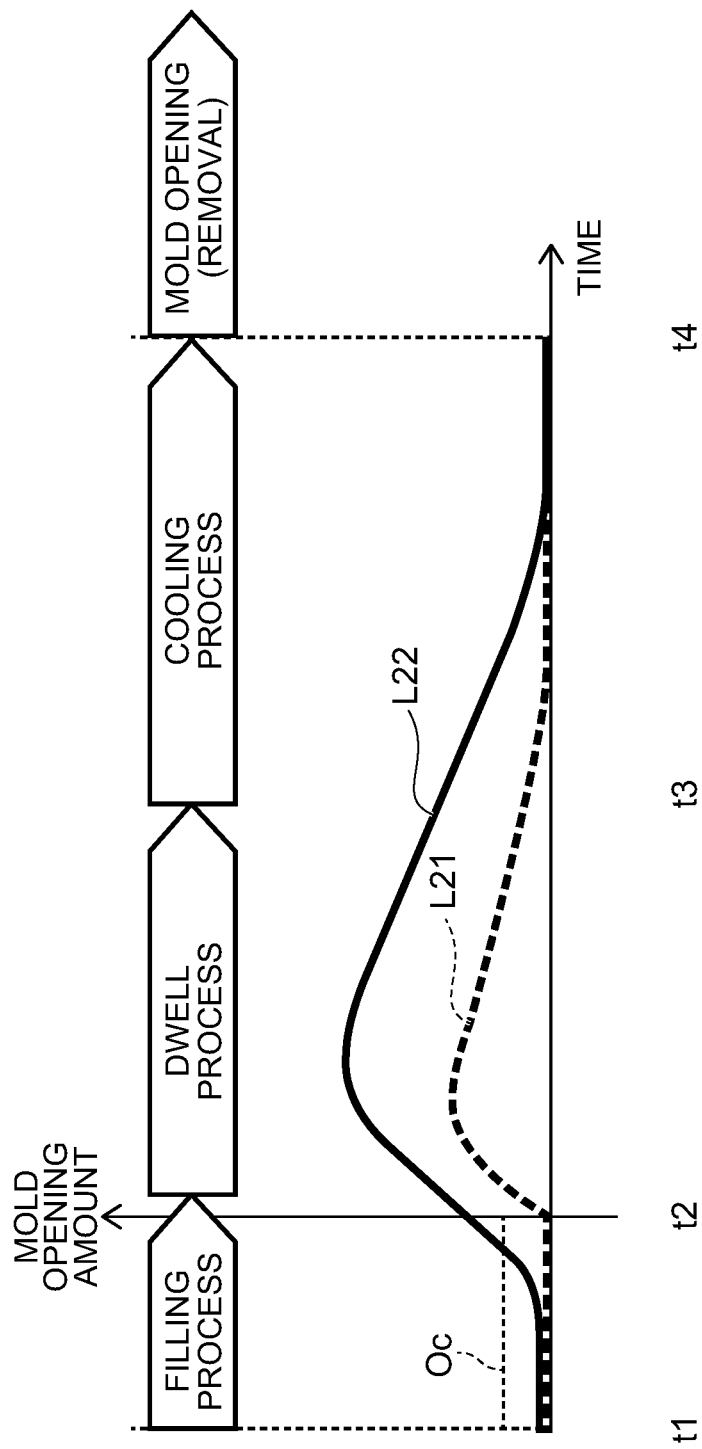
FIG. 8 is a graph illustrating an example of mold opening amount temporal change during each execution of the molding cycle according to Modification 2.

FIG. 8 is a graph illustrating an example of temporal change of the mold opening amount during each execution of the molding cycle according to Modification 2. Modification 2 of the first embodiment is different from the first embodiment in that the mold opening amount in the filling process (t1 to t2) is used as an end condition of the molding condition selection. Dashed line L21 represents the mold opening amount when the end condition is not satisfied. Solid line L22 represents the mold opening amount when the end condition is satisfied.

The mold internal pressure increases from start (t1) of the filling process and abruptly increases near filling completion. As described in the first embodiment, the injection pressure is not changed from that set in normal molding. Accordingly, the clamping force is sufficiently large at an initial stage of the condition selection, and thus the mold opening amount in the filling process (t1 to t2) is substantially 0 mm as illustrated with L21. However, as the condition selection proceeds and the clamping force decreases, the clamping force becomes smaller than the injection pressure in some cases. In such a case, the molds 11 and 12 are opened in the filling process (t1 to t2) as illustrated with L22, and a burr potentially occurs.

Thus, when the mold opening amount in the injecting process is larger than a stop mold opening amount Oc, the controlling unit 8 performs update to increase the clamping force and then stops update of the clamping force and the dwell pressure. The injection molding machine 1 repeatedly executes the molding cycle under the clamping force and the dwell pressure updated by the controlling unit 8. The stop mold opening amount Oc is an allowable value of the mold opening amount in the filling process, which is optionally set by the user. For example, when the mold opening amount in the injecting process is larger than the stop mold opening amount Oc, the controlling unit 8 performs update to set the clamping force back to that in the previous execution of the molding cycle even when the molding condition is in region B. Thereafter, the molding condition selection ends and product mass production is performed under the selected molding condition.

After having set back the clamping force, the controlling unit 8 may further decrease or may increase the dwell pressure. The dwell pressure is a molding condition that does not affect the filling process. Thus, the controlling unit 8 may cause the injection molding machine 1 to repeatedly execute the molding cycle while decreasing or increasing the dwell pressure and may continue condition selection of the dwell pressure.

The injection molding machine 1 according to Modification 2 can provide effects same as those of the first embodiment. The injection molding machine 1 according to Modification 2 may be combined with Modification 1.

The end condition in Modification 2 may be combined with the number of repetitions as the end condition in the first embodiment. In this case, for example, the controlling unit 8 stops update of the clamping force and the dwell pressure when either end condition is satisfied.

(Modification 3)

Modification 2 of the first embodiment uses an end condition different from that in the first embodiment. Modification 3 of the first embodiment is different from the first embodiment in that the clamping force is used as an end condition of the molding condition selection.

When the updated clamping force is equal to or smaller than stop clamping force, the controlling unit 8 stops update of the clamping force and the dwell pressure. The injection molding machine 1 repeatedly executes the molding cycle under the clamping force and the dwell pressure updated by the controlling unit 8. The stop clamping force is a target value of the clamping force, which is optionally set by the user. The clamping force does not need to be further decreased in some cases when the clamping force is sufficiently small to prevent a molding defect. Thus, a time taken for the molding condition selection can be reduced by ending the condition selection.

The injection molding machine 1 according to Modification 3 can provide effects same as those of the first embodiment. The injection molding machine 1 according to Modification 3 may be combined with Modifications 1 and 2.

The end condition in Modification 3 may be combined with the end condition in each of the first embodiment and Modification 2. In this case, for example, the controlling unit 8 stops update of the clamping force and the dwell pressure when either end condition is satisfied.

Second Embodiment

Figure 9:
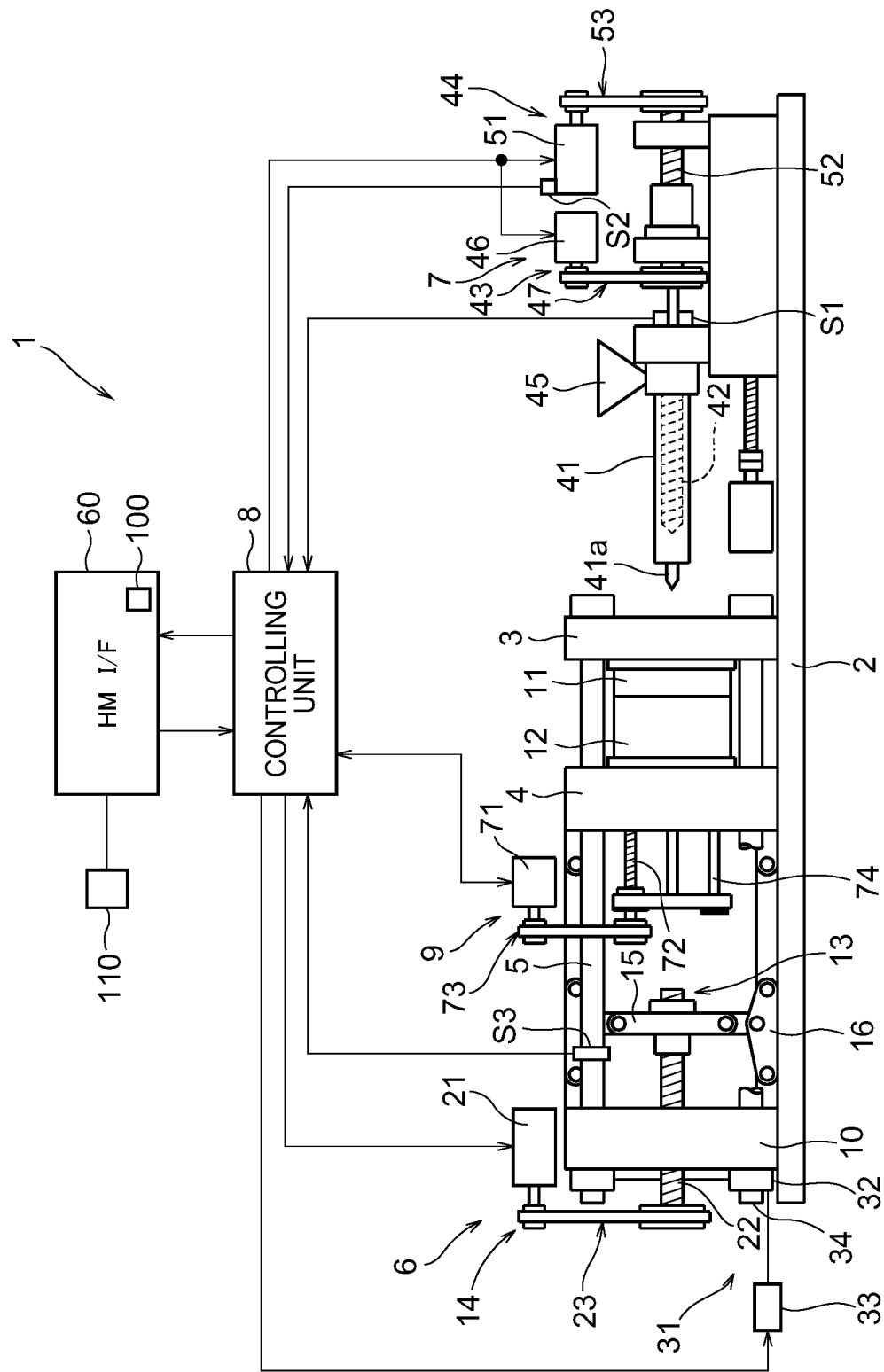
FIG. 9 is a block diagram illustrating an example of the configuration of an injection molding machine according to a second embodiment.

FIG. 9 is a block diagram illustrating an example of the configuration of the injection molding machine 1 according to a second embodiment. The second embodiment is different from the first embodiment in that the clamping force is adjusted by mold thickness adjustment in place of the toggle mechanism 13. The clamping force adjustment is, for example, update of the clamping force as in steps St2 and St3 in FIG. 4.

The injection molding machine 1 also includes a mold thickness adjusting mechanism 31. The mold thickness adjusting mechanism 31 adjusts the distance between the supporting board (toggle supporting board) 10 and the fixed mold 11 (fixed board 3). The mold thickness adjusting mechanism 31 includes an adjusting nut 32 and a mold thickness adjusting motor 33.

The adjusting nut 32 is provided at a rear end (left end in FIG. 9) of the supporting board 10. The supporting board 10 has an insertion hole (not illustrated) into which the tie bar 5 is inserted. The tie bar 5 includes a screw part 34 at a left end and has a right end fixed to the fixed board 3. The adjusting nut 32 is rotatably provided to the screw part 34.

The mold thickness adjusting motor 33 is connected with the controlling unit 8. A transferring mechanism (not illustrated) connected with the mold thickness adjusting motor 33 transfers rotation of the mold thickness adjusting motor 33 to the adjusting nut 32. Accordingly, the supporting board 10 can be moved by a predetermined distance. As a result, the separation distance between the supporting board 10 and the fixed board 3 can be adjusted to a state (lock-up state) in which the toggle link 16 is fully extended, thereby pulling the tie bar 5 to increase the clamping force.

Any other configuration of the injection molding machine according to the second embodiment is same as the corresponding configuration of the injection molding machine 1 according to the first embodiment, and thus detailed description thereof is omitted. Although the clamp driving mechanism 6 is illustrated in FIG. 9, no clamp driving mechanism 6 may be included in the injection molding machine 1 according to the second embodiment.

Figure 10:
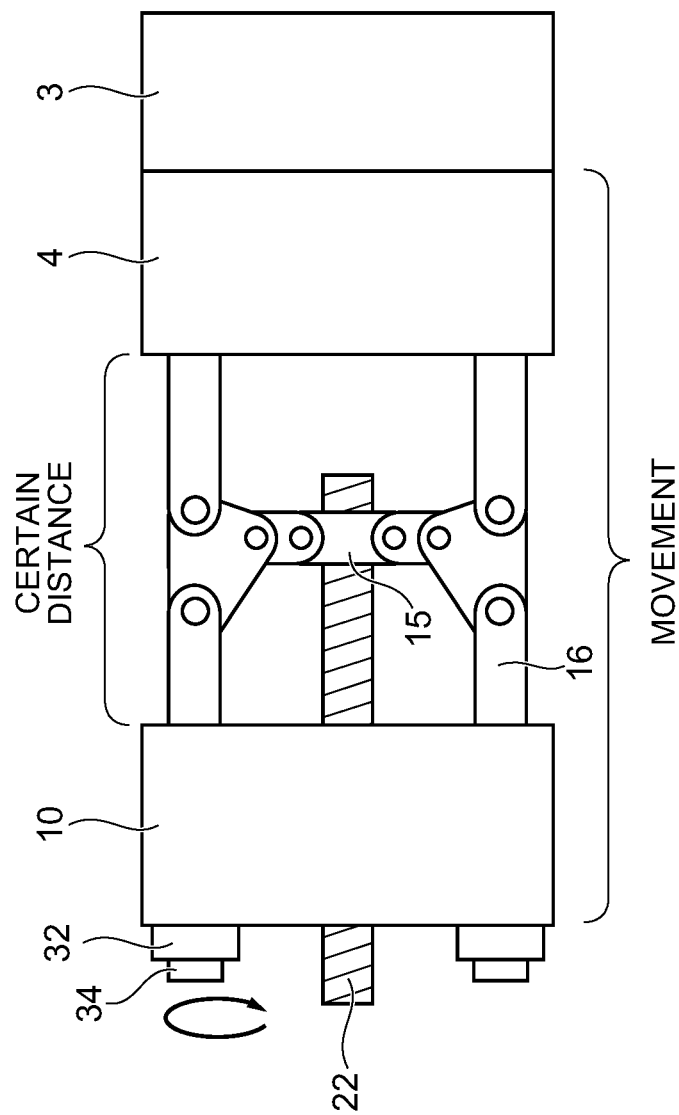
FIG. 10 is a schematic diagram illustrating an example of clamping force adjustment by a mold thickness adjusting mechanism.

FIG. 10 is a schematic diagram illustrating an example of clamping force adjustment by the mold thickness adjusting mechanism 31.

For example, in the mold thickness adjustment, the clamping force can be generated by moving the supporting board 10 in the state (lock-up state) in which the toggle link 16 is fully extended. In this case, the toggle link 16, the cross head 15, the ball screw 22, and the moving board 4 integrally move in accordance with the movement of the supporting board 10 through the mold thickness adjustment. The clamping force decreases as the supporting board 10 moves away from the fixed board 3. The clamping force increases as the supporting board 10 moves toward the fixed board 3. In this manner, the clamping force can be adjusted by adjusting the separation distance between the supporting board 10 and the fixed board 3.

At clamping force generation, the clamping force is mechanically held since the toggle link 16 is in the lock-up state. Thus, a load on the clamping servomotor 21 illustrated in FIG. 9 can be reduced with the mold thickness adjustment as compared to the clamping force adjustment by the clamp driving mechanism 6. Details of the load on the clamping servomotor 21 will be described later in Modification 4.

The injection molding machine 1 according to the second embodiment can provide effects same as those of the first embodiment. The injection molding machine 1 according to the second embodiment may be combined with Modifications 1 and 2.

(Modification 4)

Modification 4 of the second embodiment is different from the second embodiment in that adjustment is performed by both the clamp driving mechanism 6 and the mold thickness adjusting mechanism 31.

The clamp driving mechanism 6 including a toggle can perform the clamping force adjustment in a shorter time than the mold thickness adjustment. However, the load on the clamping servomotor 21 potentially becomes large when long-time continuous molding such as mass production is performed in a state (non-lock-up state) in which the toggle link 16 is not fully extended. This is because holding torque that holds a motor stop state (state in which the toggle link 16 is bent) is exerted on the clamping servomotor 21.

Thus, the controlling unit 8 updates the clamping force through expansion and contraction of the toggle link 16 in the non-lock-up state. In addition, the controlling unit 8 adjusts the distance through the mold thickness adjustment so that, after update of the clamping force is stopped, the clamping force in the lock-up state of the toggle link 16 becomes equal to clamping force at update stop. For example, in the molding condition selection, the controlling unit 8 updates the clamping force by the clamp driving mechanism 6 in the non-lock-up state without performing the mold thickness adjustment (for example, steps St2, St3, St5, St6, St8, and St9 in FIG. 4). The controlling unit 8 stops update of the clamping force at end of step St9. In this case, the separation distance between the supporting board 10 and the fixed board 3 is adjusted through the mold thickness adjustment in the non-lock-up state so that the clamping force in the lock-up state becomes equal to clamping force at update stop. Thereafter, mass production to be described later is performed in the lock-up state. Accordingly, the clamping force can be adjusted through expansion and contraction of the toggle link 16 in the molding condition selection, and the toggle link 16 can be put into the lock-up state in mass production. As a result, a time taken for the molding condition selection can be reduced and a load on the clamping servomotor 21 in product mass production can be reduced. The mold thickness adjustment may be performed so that the clamping force in the lock-up state is in a predetermined range from the clamping force at update. The clamping force at update stop may be stored in, for example, the storing unit 110.

The clamping force adjustment using both the clamp driving mechanism 6 and the mold thickness adjusting mechanism 31 may be performed by another method as described below. When setting the next clamping force in the molding condition selection, the controlling unit 8 adjusts the distance through the mold thickness adjustment simultaneously with or after setting of the state (non-lock-up state) in which the toggle link 16 is not fully extended, thereby achieving the clamping force to be set next. More specifically, in the molding condition selection, the controlling unit 8 determines whether update is needed after setting the toggle link 16 to the lock-up state, and updates the clamping force by adjusting the distance through the mold thickness adjustment in the non-lock-up state set by the clamp driving mechanism 6 (for example, steps St2, St3, St5, St6, St8, and St9 in FIG. 4). The controlling unit 8 stops update of the clamping force at end of step St9. The toggle link 16 is in the lock-up state at end of the molding condition selection. Accordingly, the mold thickness adjustment does not need to be newly performed, and thus mass production can be started immediately.

The injection molding machine 1 according to Modification 4 can provide effects same as those of the first embodiment. The injection molding machine 1 according to Modification 4 may be combined with Modifications 1, 2, and 3.

(Mass Production)

In product mass production at step St10, the controlling unit 8 performs production in the lock-up state of the toggle link 16. Production in the non-lock-up state is possible but needs to be carefully performed since a load on the clamping servomotor 21 is potentially large as described above. Before executing the product mass production at step St10, the controlling unit 8 adjusts the clamping force through the mold thickness adjustment to achieve the clamping force at update stop.

At least part of the injection molding machine 1 according to the present embodiment and the method of controlling the same may be configured as hardware or software. In a case of software configuration, a computer program that achieves the function of at least part of the injection molding machine 1 and the method of controlling the same may be stored in a recording medium such as a flexible disk or a CD-ROM and may be read and executed by a computer. The recording medium is not limited to a detachable medium such as a magnetic disk or an optical disk but may be a fixed recording medium such as a hard disk device or a memory. The computer program that achieves the function of at least part of the injection molding machine 1 and the method of controlling the same may be distributed through a communication line (including wireless communication) such as the Internet. Moreover, the computer program in an encrypted, modulated, or compressed state may be distributed through a wired or wireless line such as the Internet or may be stored in a recording medium and distributed.

While certain embodiments of the present invention have been described, these embodiments have been presented by way of example only, and are not intended to limit the scope of the inventions. Indeed, the novel device, method, and computer program described herein may be embodied in a variety of other forms; furthermore, various omissions, substitutions and changes in the form of the device, method, and computer program described herein may be made without departing from the spirit of the inventions. The accompanying claims and their equivalents are intended to cover such forms or modifications as would fall within the scope and spirits of the inventions.

REFERENCE SIGNS LIST 1 injection molding machine, 5 tie bar, 6 clamp driving mechanism, 7 injecting device, 8 controlling unit, 10 supporting board, 11 fixed mold, 12 moving mold, 13 toggle mechanism, 16 toggle link, 31 mold thickness adjusting mechanism, O1 first mold opening amount, O2 second mold opening amount, Oa predetermined mold opening amount, Ob target mold opening amount, Oc stop mold opening amount, S3 tie bar sensor

The invention claimed is:

1. An injection molding machine that molds a product for each execution of a molding cycle through an injecting process of injecting a material into clamped molds, a dwell process of controlling dwell pressure of the material in the molds, and a cooling process of cooling the material in the molds, the injection molding machine comprising:

a mold opening amount sensor configured to detect a mold opening amount of the molds; and a controlling unit configured to control clamping force of the molds and the dwell pressure based on the mold opening amount during the molding cycle, wherein, the molds include a first mold and a second mold facing each other;

the injection molding machine further includes:
- a toggle mechanism including a toggle link and a toggle supporting board configured to move the first mold by bending or extension of the toggle link, the toggle link including a first end connected with the first mold and a second end connected with the toggle supporting board, the toggle supporting board supporting the toggle link, and
- a mold thickness adjusting mechanism configured to adjust a distance between the toggle supporting board and the second mold;

the controlling unit is configured to update the clamping force by expansion and contraction of the toggle link in a non-lock-up state; and the controlling unit is configured to adjust the distance so that, after update of the clamping force is stopped, the clamping force in a lock-up state of the toggle link becomes equal to the clamping force at update stop.

2. The injection molding machine according to claim 1, wherein the controlling unit is configured to control the clamping force and the dwell pressure based on a first mold opening amount that is the mold opening amount at end of the cooling process.

3. The injection molding machine according to claim 2, wherein:

the injection molding machine is configured to repeatedly execute the molding cycle, and for each execution of the molding cycle, the controlling unit is configured to:
- perform a first update causing a decrease in the clamping force in response to the first mold opening amount being equal to or smaller than a predetermined mold opening amount, and
- perform a second update causing an increase in the clamping force and a decrease in the dwell pressure in response to the first mold opening amount being larger than the predetermined mold opening amount.

4. The injection molding machine according to claim 3, wherein the predetermined mold opening amount is a second mold opening amount that is the mold opening amount at a start of the injecting process, or the predetermined mold opening amount is a mold opening amount larger than the second mold opening amount.

5. The injection molding machine according to claim 1, wherein the controlling unit is configured to control the clamping force and the dwell pressure based on a maximum value of the mold opening amount in the dwell process or the cooling process.

6. The injection molding machine according to claim 5, wherein the injection molding machine is configured to repeatedly execute the molding cycle, and for each execution of the molding cycle, the controlling unit is configured to:
- perform a first update causing a decrease in the clamping force in response to the maximum value being equal to or smaller than a target mold opening amount, and
- perform a second update causing an increase in the clamping force and a decrease in the dwell pressure in response to the maximum value being larger than the target mold opening amount.

7. The injection molding machine according to claim 1, wherein:

the controlling unit is configured to perform an update causing an increase in the clamping force and then stops the update of the clamping force and the dwell pressure in response to the mold opening amount in the injecting process being larger than a stop mold opening amount, and the injection molding machine is configured to repeatedly execute the molding cycle under the clamping force and the dwell pressure updated by the controlling unit.

8. The injection molding machine according to claim 1, wherein:

the controlling unit is configured to stop an update of the clamping force and the dwell pressure in response to an updated clamping force being equal to or smaller than a stop clamping force, and the injection molding machine is configured to repeatedly execute the molding cycle under the clamping force and the dwell pressure updated by the controlling unit.

9. The injection molding machine according to claim 1, wherein the mold opening amount sensor is provided to a tie bar included in the injection molding machine and is a tie bar sensor or a mold position sensor, the tie bar sensor being configured to detect extension of the tie bar that expands and contracts in accordance with the clamping force, the mold position sensor being configured to detect positions of the molds.

10. The injection molding machine according to claim 1, wherein the controlling unit is configured to automatically control the clamping force and the dwell pressure.

11. A method of controlling an injection molding machine that molds a product for each execution of a molding cycle through an injecting process of injecting a material into clamped molds, a dwell process of controlling dwell pressure of the material in the molds, and a cooling process of cooling the material in the molds, the injection molding machine including a mold opening amount sensor and a controlling unit, wherein, the molds include a first mold and a second mold facing each other;

the injection molding machine further includes:
- a toggle mechanism including a toggle link and a toggle supporting board configured to move the first mold by bending or extension of the toggle link, the toggle link including a first end connected with the first mold and a second end connected with the toggle supporting board, the toggle supporting board supporting the toggle link, and
- a mold thickness adjusting mechanism configured to adjust a distance between the toggle supporting board and the second mold, the method comprising:

detecting, by the mold opening amount sensor, a mold opening amount of the molds; and controlling, by the controlling unit, the injection molding machine, wherein the controlling unit controls clamping force of the molds and the dwell pressure based on the mold opening amount during the molding cycle, wherein the method further comprises:

updating, by the controlling unit, the clamping force by expansion and contraction of the toggle link in a non-lock-up state; and adjusting, by the controlling unit, the distance so that, after update of the clamping force is stopped, the clamping force in a lock-up state of the toggle link becomes equal to the clamping force at update stop.

* * * * *